United States Patent
Jain et al.

(10) Patent No.: US 11,449,812 B2
(45) Date of Patent: Sep. 20, 2022

(54) SYSTEM FOR ESTABLISHMENT AND DYNAMIC ADJUSTMENT OF CONTROL PARAMETERS ASSOCIATED WITH RESOURCE DISTRIBUTION

(71) Applicant: BANK OF AMERICA CORPORATION, Charlotte, NC (US)

(72) Inventors: Jeetendra Hukmichand Jain, Charlotte, NC (US); Saurabh Mavani, Lake Hopatcong, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 5 days.

(21) Appl. No.: 16/938,417

(22) Filed: Jul. 24, 2020

(65) Prior Publication Data
US 2022/0027815 A1   Jan. 27, 2022

(51) Int. Cl.
*G06Q 10/06* (2012.01)

(52) U.S. Cl.
CPC ..... *G06Q 10/06311* (2013.01); *G06Q 10/06312* (2013.01)

(58) Field of Classification Search
CPC ....... G06Q 10/06311; G06Q 10/06312; G06Q 10/06315; G06F 9/5011
See application file for complete search history.

(56) References Cited

U.S. PATENT DOCUMENTS

| | | |
|---|---|---|
| 6,422,462 B1 | 7/2002 | Cohen |
| 7,401,731 B1 | 7/2008 | Pletz et al. |
| 2004/0143527 A1 | 7/2004 | Benkert et al. |
| 2013/0212278 A1* | 8/2013 | Marshall ............ G06F 21/31 709/226 |
| 2014/0180862 A1* | 6/2014 | Certain ............... G06Q 30/08 705/26.3 |
| 2014/0310769 A1* | 10/2014 | O'Neill ............... H04L 9/3213 726/1 |

(Continued)

OTHER PUBLICATIONS

Visa Payment Controls https://sr.visa.com/run-your-business/small-business/cards/visa-payment-controls.html retrieved Oct. 26, 2020.

*Primary Examiner* — Andre D Boyce
*Assistant Examiner* — Stephen S Swartz
(74) *Attorney, Agent, or Firm* — Moore & Van Allen PLLC; Nicholas C. Russell

(57) ABSTRACT

Systems, computer program products, and methods are described herein for establishment and dynamic adjustment of control parameters associated with resource distribution. The present invention may be configured to determine, based on historical data of resource distributions, suggested control parameters for resource distributions associated with a source associated with a user and provide the suggested control parameters to the user. The present invention may be configured to receive, after providing the suggested control parameters to the user, user input identifying user-defined control parameters. The present invention may be configured to receive a request to authorize a resource distribution, determine, based on the user-defined control parameters, whether the resource distribution is permitted, and authorize, based on determining that the resource distribution is permitted, the resource distribution.

20 Claims, 2 Drawing Sheets

(56) References Cited

U.S. PATENT DOCUMENTS

| | | | |
|---|---|---|---|
| 2016/0006744 A1* | 1/2016 | Du | H04L 67/18 |
| | | | 726/4 |
| 2016/0295624 A1* | 10/2016 | Novlan | H04L 67/12 |
| 2017/0364918 A1 | 12/2017 | Malhotra et al. | |
| 2019/0259293 A1* | 8/2019 | Hellman | G06F 9/451 |
| 2020/0042920 A1* | 2/2020 | Moorthy | G06N 7/005 |
| 2021/0345134 A1* | 11/2021 | Ottersten | G06N 5/04 |

* cited by examiner

SYSTEM FOR ESTABLISHMENT AND DYNAMIC ADJUSTMENT OF CONTROL PARAMETERS ASSOCIATED WITH RESOURCE DISTRIBUTION

FIELD OF THE INVENTION

The present invention embraces a system for establishment and dynamic adjustment of control parameters associated with resource distribution.

BACKGROUND

A resource management system may authorize or deny requests from entities for resource distributions from sources associated with users. For example, the resource management system may authorize a request for a resource distribution and perform the resource distribution from a source to an entity.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for establishment and dynamic adjustment of control parameters associated with resource distribution is presented. The system comprises: at least one non-transitory storage device; and at least one processing device coupled to the at least one non-transitory storage device, wherein the at least one processing device is configured to: determine, based on historical data of resource distributions, suggested control parameters for resource distributions associated with a source associated with a user; provide the suggested control parameters to the user; receive, after providing the suggested control parameters to the user, user input identifying user-defined control parameters; receive a request to authorize a resource distribution; determine, based on the user-defined control parameters, whether the resource distribution is permitted; and authorize, based on determining that the resource distribution is permitted, the resource distribution.

In some embodiments, the historical data of resource distributions comprises historical data of resource distributions associated with the user.

In some embodiments, the historical data of resource distributions comprises historical data of resource distributions associated with multiple users.

In some embodiments, the at least one processing device is configured to, when providing the suggested control parameters to the user, cause the suggested control parameters to be displayed to the user.

In some embodiments, the at least one processing device is configured to, when providing the suggested control parameters to the user, transmit the suggested control parameters to a user device associated with the user.

In some embodiments, the at least one processing device is configured to deny, based on determining that the resource distribution is not permitted, the resource distribution.

In some embodiments, the at least one processing device is configured to: deny, based on determining that the resource distribution is not permitted, the resource distribution; and provide, based on denying the resource distribution, a notification to the user.

In some embodiments, the at least one processing device is configured to: receive, from the user, an instruction to suspend a user-defined control parameter of the user-defined control parameters; receive another request to authorize another resource distribution; and authorize, based on the instruction to suspend the user-defined control parameter, the other resource distribution.

In some embodiments, the at least one processing device is configured to: receive, from the user, an instruction to change, for a time period, a user-defined control parameter of the user-defined control parameters; receive, during the time period, another request to authorize another resource distribution; and authorize, based on the instruction to change the user-defined control parameter, the other resource distribution.

In some embodiments, the at least one processing device is configured to: receive, from the user, an instruction to change, for a time period, a user-defined control parameter of the user-defined control parameters; receive, after the time period, another request to authorize another resource distribution; and deny, based on the user-defined control parameters, the other resource distribution.

In some embodiments, the at least one processing device is configured to, when receiving the user input identifying user-defined control parameters, receive user input identifying user-defined control parameters for at least one of: multiple payment instruments associated with the source; or each payment instrument of multiple payment instruments associated with the source.

In some embodiments, the at least one processing device is configured to, when determining whether the resource distribution is permitted, determine whether attributes of the resource distribution satisfy thresholds based on the user-defined control parameters.

In some embodiments, the at least one processing device is configured to: update, based on historical data of resource distributions, the suggested control parameters to generate updated suggested control parameters; and provide the updated suggested control parameters to the user.

In some embodiments, the user input identifying the user-defined control parameters comprises user input adjusting the suggested control parameters to identify the user-defined control parameters.

In some embodiments, the at least one processing device is configured to: when providing the suggested control parameters to the user, cause a graphical user interface including the suggested control parameters to be displayed to the user; and wherein the user input identifying the user-defined control parameters comprises user input, via the graphical user interface, adjusting the suggested control parameters to identify the user-defined control parameters.

In another aspect, a computer program product for establishment and dynamic adjustment of control parameters associated with resource distribution is presented. The computer program product comprises a non-transitory computer-readable medium comprising code causing a first apparatus to: determine, based on historical data of resource distributions, suggested control parameters for resource distributions associated with a source associated with a user; provide the suggested control parameters to the user; receive, after providing the suggested control parameters to the user, user input identifying user-defined control parameters;

receive a request to authorize a resource distribution; determine, based on the user-defined control parameters, whether the resource distribution is permitted; and authorize, based on determining that the resource distribution is permitted, the resource distribution.

In some embodiments, the historical data of resource distributions comprises historical data of resource distributions associated with the user.

In some embodiments, the historical data of resource distributions comprises historical data of resource distributions associated with multiple users.

In some embodiments, the non-transitory computer-readable medium comprises code causing the first apparatus to, when providing the suggested control parameters to the user, cause the suggested control parameters to be displayed to the user.

In yet another aspect, a method for establishment and dynamic adjustment of control parameters associated with resource distribution is presented. The method comprises determining, based on historical data of resource distributions, suggested control parameters for resource distributions associated with a source associated with a user; providing the suggested control parameters to the user; receiving, after providing the suggested control parameters to the user, user input identifying user-defined control parameters; receiving a request to authorize a resource distribution; determining, based on the user-defined control parameters, whether the resource distribution is permitted; and authorizing, based on determining that the resource distribution is permitted, the resource distribution.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
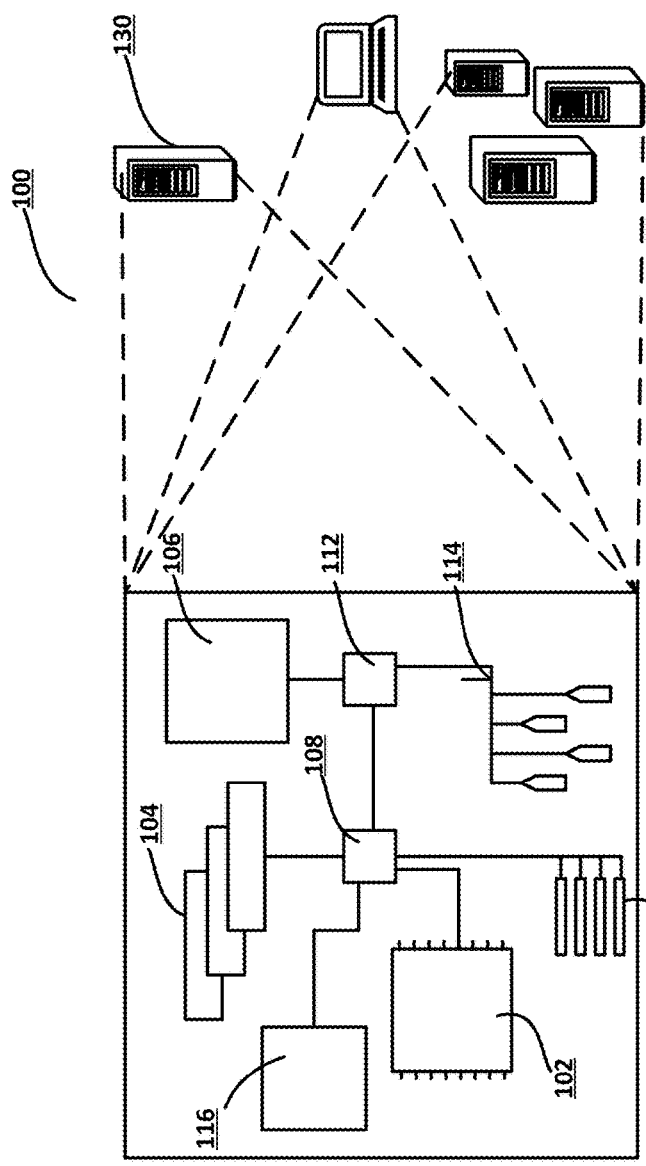
Figure 1:
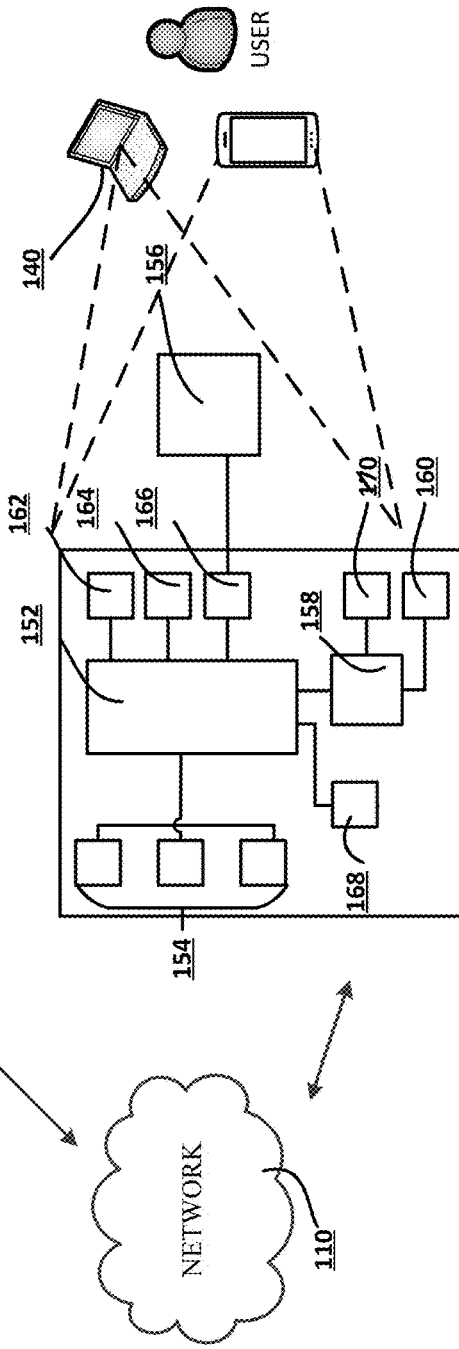
Figure 2:
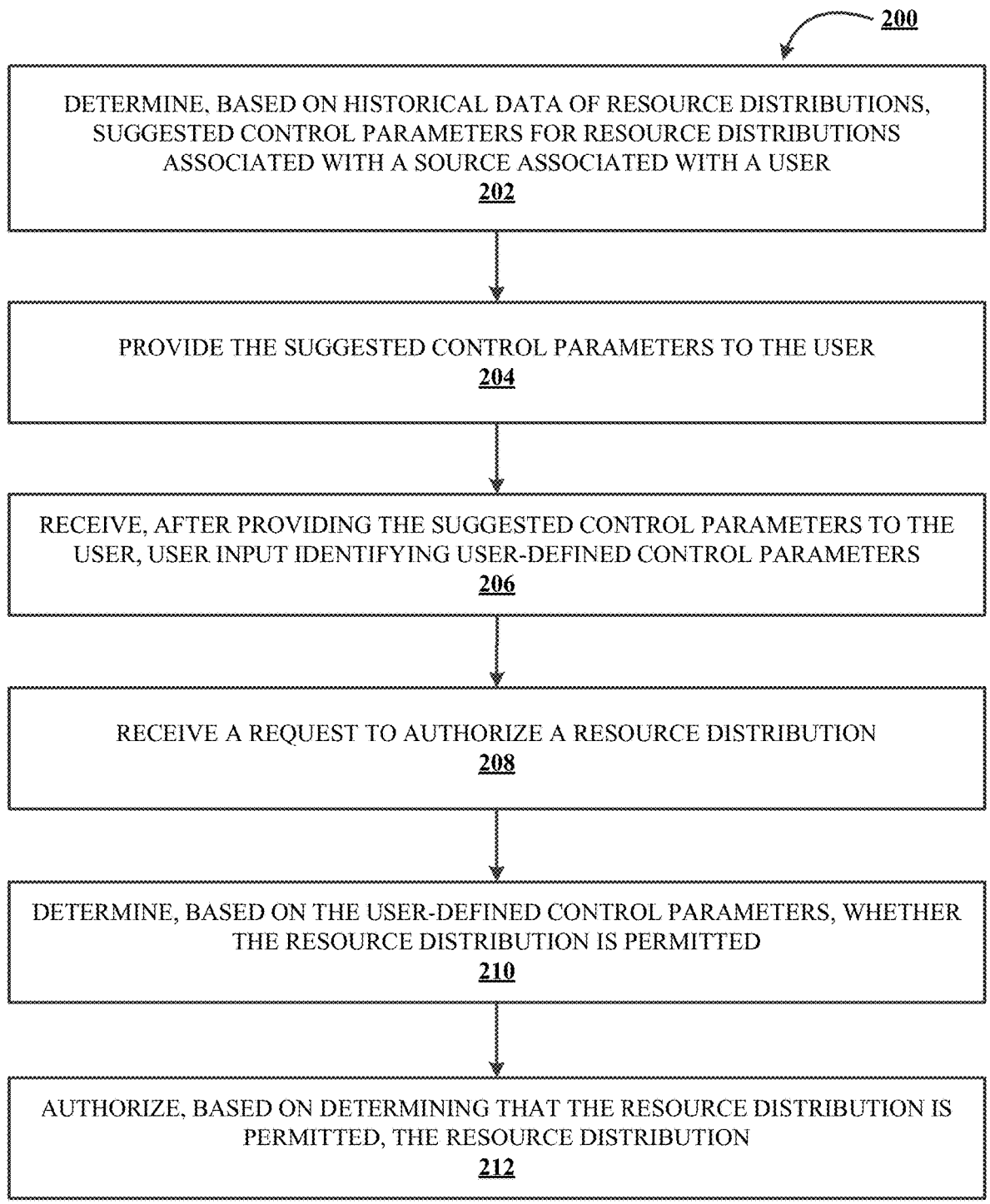

Having thus described embodiments of the invention in general terms, reference will now be made the accompanying drawings, wherein:

FIG. 1 illustrates technical components of a system for establishment and dynamic adjustment of control parameters associated with resource distribution, in accordance with an embodiment of the invention; and FIG. 2 illustrates a process flow for establishment and dynamic adjustment of control parameters associated with resource distribution, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, a user interface may include a graphical user interface (GUI) or an interface to input computer-executable instructions that direct a processing device to carry out specific functions. The user interface may employ input and output devices to input data received from a user or output data to a user. These input and output devices may include a display, a mouse, a keyboard, a button, a touchpad, a touch screen, a microphone, a speaker, an LED light, a joystick, a switch, a buzzer, a bell, and/or other user input/output devices for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, offers, discounts, currency, cash, cash equivalents, credits, rewards, reward points, benefit rewards, bonus miles, cash back, and/or the like. Some example embodiments herein contemplate property held by a user, including property that is stored and/or maintained by a third-party entity. In some example embodiments, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "source" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like. Some example embodiments include one or more sources associated with a user.

As used herein, a "distribution," such as a resource distribution and/or the like, may refer to any transactions, activities, or communications between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource distribution may refer to one or more of: a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, or any other interaction involving the user and/or the user's device that invokes or is detectable by the financial institution. In some embodiments, a resource distribution may have one or more attributes, such as a source from which resources are to be distributed, a payment instrument used to initiate the resource distribution, an amount of resources to be distributed, a recipient entity of the resources to be distributed, a type of recipient entity, and/or the like. In some embodiments, the user may initiate a resource distribution using a payment instrument such as a payment vehicle (credit cards, debit cards, checks, digital wallets, currency, loyalty points), payment credentials (account numbers, payment instrument identifiers), and/or the like. In some embodiments, after a user initiates a resource distribution, an entity may transmit a request for a resource distribution to a resource management system. A resource distribution may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource distribution," a "resource transfer," a "transaction", a "transaction event," or a "point of transaction event" may refer to any activity between a user, a merchant, an entity, or any combination thereof. In some embodiments, a resource distribution may refer to financial transactions involving direct or indirect movement of funds through traditional paper transaction processing systems (e.g., paper check processing) or through electronic transaction processing systems. In this regard, resource distributions may refer to the user initiating a purchase for a product, service, or the like from a merchant. Typical financial distributions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource distributions are evaluated, such descriptions may mean that a resource distribution has already occurred, is in the process of occurring or being processed, or has yet to be processed/posted by one or more financial institutions. In some embodiments, a resource distribution may refer to non-financial activities of the user. In this regard, the resource distribution may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. In some embodiments, the payment instrument may not be a "card" and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

A resource management system may authorize or deny requests from entities for resource distributions from sources associated with users. In some embodiments, the resource management system may permit a user to establish control parameters for resource distributions, and the resource management system may authorize or deny resource distributions based on the control parameters. However, the user may establish control parameters that are too restrictive (e.g., deny too many resource distributions) and/or too permissive (e.g., authorize too many resource distributions) as compared to typical resource distributions initiated by the user. For example, the user may establish a control parameter to deny resource distributions to an entity that are over a particular amount, when the user typically initiates resource distributions to the entity over the particular amount. In such an example, the resource management system, based on the control parameter established by the user, would deny typical resource distributions to the entity initiated by the user. Denying resource distributions (e.g., that are typical resource distributions between the entity and the user) consumes computing resources (e.g., processing resources, memory resources, power resources, communication resources, and/or the like) and/or network resources associated with transmitting and receiving the requests for resource distributions, transmitting and receiving the denials of the resource distributions, repeated attempts, after denials, to re-initiate the resource distributions, addressing complaints submitted by the entity and/or the user, and/or the like. Additionally, or alternatively, authorizing too many resource distributions (e.g., that are not typical resource distributions between the entity and the user) may increase a likelihood that a falsified request for a resource distribution is authorized, which consumes the falsely obtained resources, computing resources (e.g., processing resources, memory resources, power resources, communication resources, and/or the like) and/or network resources associated with detecting the falsified request, reversing the falsely obtained resources, reporting the falsified request and authorization to the entity and/or the user, and/or the like.

Some embodiments of the present invention described herein include a system, a computer program product, and/or a method for establishment and dynamic adjustment of control parameters associated with resource distribution. In some embodiments, the present invention may include determining, based on historical data of resource distributions, suggested control parameters for resource distributions associated with a source associated with a user, providing the suggested control parameters to the user, and receiving, after providing the suggested control parameters to the user, user input identifying user-defined control parameters. The present invention may include determining whether a resource distribution is permitted based on the user-defined control parameters. For example, the present invention may determine whether attributes of resource distributions satisfy thresholds based on the user-defined control parameters. Additionally, or alternatively, the present invention may include updating the suggested control parameters and providing the updated suggested control parameters to the user. By providing suggested control parameters to the user that are determined based on historical data of resource distributions before the user provides user-defined control parameters, some embodiments of the present invention reduce a likelihood that the user will provide user-defined control parameters that are too restrictive and/or too permissive. By reducing the likelihood that the user will provide user-defined control parameters that are too restrictive, the present invention conserves computing resources (e.g., processing resources, memory resources, power resources, communication resources, and/or the like) and/or network resources that would otherwise be consumed by transmitting and receiving requests for denied resource distributions, transmitting and receiving the denials of the resource distributions, repeated attempts, after denials, to re-initiate the resource distributions, addressing complaints submitted by the entity and/or the user, and/or the like. By reducing the likelihood that the user will provide user-defined control parameters that are too permissive, the present invention conserves computing resources (e.g., processing resources, memory resources, power resources, communication resources, and/or the like) and/or network resources that would otherwise be consumed by detecting falsified requests, reversing falsely obtained resources, reporting falsified requests and authorizations to entities and/or users, and/or the like.

FIG. 1 presents an exemplary block diagram of a system environment for recurring establishing and adjusting resource distribution control parameters, in accordance with an embodiment of the invention. FIG. 1 provides a system environment 100 that includes specialized servers and system communicably linked across a distributive network of nodes required to perform the functions of the process flows described herein in accordance with embodiments of the present invention.

As illustrated, the system environment includes a network 110, a system 130, and a user input system 140. Also shown in FIG. 1 is a user of the user input system 140. The user input system 140 may be a mobile device or other non-mobile computing device. The user may be a person who uses the user input system 140 to execute resource distributions using one or more applications stored thereon. The one or more applications may be configured to communicate with the system 130, execute a resource distribution, input information onto a user interface presented on the user input system 140, and/or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including mobile-side and server-side processes for installing a computer program from a mobile device to a computer, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, and/or the like. The components shown here, their connections and relationships, and their functions, are meant to be exemplary only, and are not meant to limit embodiments of the inventions described and/or claimed in this document.

In some embodiments, the system 130 may include a processor 102, memory 104, a storage device 106, a high-speed interface 108 connecting to memory 104, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 or on the storage device 106 to display graphical information for a GUI on an external input/output device, such as display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be a server managed by an entity, such as a business, a merchant, a financial institution, a card management institution, and/or the like. The system 130 may be located at a facility associated with the entity or remotely from the facility associated with the entity. Additionally, or alternatively, the system environment 100 may include more than one system 130. For example, the system environment 100 may include multiple systems similar to system 130, such as an authorization system, a resource distribution system, a communication system, a resource distribution control system, and/or the like connected to the network 110.

The memory 104 may store information within the system 130. In one embodiment, the memory 104 may be a volatile memory unit or units, such as volatile random-access memory (RAM) having a cache area for the temporary storage of information. In another embodiment, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., an expansion port). The low-speed bus 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and a user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and digital processors. The processor 152 may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, or other appropriate display technology. An interface of the display 156 may include appropriate circuitry, and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some embodiments, or for wireless communication in other embodiments, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and/or connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140, and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, or other such transceiver (not shown). Additionally, or alternatively, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various embodiments of the systems and techniques described here may be realized in digital electronic circuitry, integrated circuitry, specially designed ASICs (application specific integrated circuits), computer hardware, firmware, software, and/or combinations thereof. Such various embodiments may include embodiments in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (e.g., also referred to as programs, software, software applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user can provide input to the computer, and/or a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an embodiment of the systems and techniques described here), and/or any combination of such back end, middleware, or front end components. Components of the system may be interconnected by any form or medium of digital data communication (e.g., a communication network). Examples of communication networks include a local area network ("LAN"), a wide area network ("WAN"), and the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment illustrated in FIG. 1 is exemplary and other embodiments may vary. As another example, in some embodiments, the system 130 includes more, less, or different components. As another example, in some embodiments, some or all of the portions of the system 130 may be combined into a single portion. Likewise, in some embodiments, some or all of the portions of the system 130 may be separated into two or more distinct portions.

FIG. 2 illustrates a process flow 200 for establishment and dynamic adjustment of control parameters associated with resource distribution within a technical environment, in accordance with an embodiment of the invention. In some embodiments, one or more blocks of the process flow 200 may be performed by one or more systems similar to system 130 described herein with respect to FIG. 1, such as an authorization system, a resource distribution system, a communication system, a resource distribution control system, and/or the like.

As shown in block 202, the process flow includes determining, based on historical data of resource distributions, suggested control parameters for resource distributions associated with a source associated with a user. In some embodiments, the process flow may include obtaining the historical data of resource distributions from one or more databases. Additionally, or alternatively, the historical data of resource distributions may include attributes of previously performed resource distributions associated with the user, attributes of previously performed resource distributions associated with multiple users (e.g., multiple users associated with an entity), and/or the like.

In some embodiments, the process flow may include determining suggested control parameters by determining relationships between attributes, average values of attributes (e.g., over a time period), average ranges of attributes (e.g., over a time period), predicted values of attributes, predicted ranges of attributes, and/or the like. For example, determining a suggested control parameter for resource distributions associated with a recipient entity may include determining an average amount of resources distributed to the recipient entity in historical resource distributions. As another example, determining a suggested control parameter for resource distributions associated with a type of recipient entity may include determining an average range of amounts of resources distributed to entities of the type in historical resource distributions.

In some embodiments, the process flow may include determining suggested control parameters using machine learning and/or a forecasting model. For example, a system 130 performing the process flow may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. One or more modules may implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, an LDA, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 130 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 130. Further, any suitable model (e.g., machine learning, non-machine learning, etc.) can be used in generating data relevant to the system 130. In some embodiments, the one or more machine learning algorithms may be predictive modeling algorithms configured to use data and statistics to predict outcomes with forecasting models.

In some embodiments, the forecasting model may be generated by training on data regarding resource distributions (e.g., including attributes of resource distributions and/or the like) over a predetermined past period of time. In doing so, the system may be configured to determine which attributes future resource distributions (e.g., initiated by the user) will be likely to have. In some other embodiments, the system 130 may be configured to determine that attributes of resource distributions are increasing or decreasing over time. For example, the forecasting model may predict that an amount of resources distributed to a type of entity will increase in the future (e.g., based on an increasing trend of amounts of resources associated with resource distributions involving the type of entity and/or the like). The system 130 may, based on the forecasting model, determine suggested control parameters such that, as attributes increase or decrease over time, the suggested control parameters are not too restrictive and/or too permissive.

Next, as shown in block 204, the process flow includes providing the suggested control parameters to the user. In some embodiments, providing the suggested control parameters to the user may include causing the suggested control parameters to be displayed to the user (e.g., on a display of a user device associated with the user and/or the like). For example, providing the suggested control parameters to the user may include causing a graphical user interface including the suggested control parameters to be displayed to the user. Additionally, or alternatively, providing the suggested control parameters to the user may include transmitting the suggested control parameters to a user device associated with the user (e.g., transmitting a message, a notification, an alert, an email, and/or the like including the suggested control parameters).

Next, as shown in block 206, the process flow includes receiving, after providing the suggested control parameters to the user, user input identifying user-defined control parameters. For example, the user input identifying the user-defined control parameters may include user input adjusting the suggested control parameters to identify the user-defined control parameters. In some embodiments, the user input identifying the user-defined control parameters may include user input, via a graphical user interface, adjusting the suggested control parameters to identify the user-defined control parameters. For example, the user input may increase, decrease, expand a range of, reduce a range of, one or more of the suggested control parameters to identify the user-defined control parameters.

Additionally, or alternatively, providing the suggested control parameters to the user may include causing a graphical user interface including the suggested control parameters to be displayed to the user, and the user input identifying the user-defined control parameters may include user input, via the graphical user interface, adjusting the suggested control parameters to identify the user-defined control parameters. For example, the graphical user interface may include one or more lines representing control parameters and one or more sliding windows on the one or more lines representing the suggested control parameters (e.g., ranges, values, and/or the like), and the user input may adjust the sliding windows on the lines to input the user-defined control parameters.

By providing suggested control parameters to the user that are determined based on historical data of resource distributions before the user provides user-defined control parameters, some embodiments of the process flow reduce a likelihood that the user will provide user-defined control parameters that are too restrictive and/or too permissive. By reducing the likelihood that the user will provide user-defined control parameters that are too restrictive, some embodiments of the process flow conserve computing resources (e.g., processing resources, memory resources, power resources, communication resources, and/or the like) and/or network resources that would otherwise be consumed by transmitting and receiving requests for denied resource distributions, transmitting and receiving the denials of the resource distributions, repeated attempts, after denials, to re-initiate the resource distributions, addressing complaints submitted by the entity and/or the user, and/or the like. By reducing the likelihood that the user will provide user-defined control parameters that are too permissive, some embodiments of the process flow conserve computing resources (e.g., processing resources, memory resources, power resources, communication resources, and/or the like) and/or network resources that would otherwise be consumed by detecting falsified requests, reversing falsely obtained resources, reporting falsified requests and authorizations to entities and/or users, and/or the like.

In some embodiments, the process flow may include receiving user input identifying user-defined control parameters for multiple payment instruments associated with the source, each payment instrument of multiple payment instruments associated with the source, and/or the like. For example, two or more payment instruments may be associated with the source, and the user input may identify user-defined control parameters to be used when determining whether a resource distribution is permitted from the source regardless of which payment instrument is used. In other words, the user-defined control parameters may be generic with respect to the payment instruments associated with the source. Additionally, or alternatively, two or more payment instruments may be associated with the source, and the user input may identify user-defined control parameters for each of the two or more payment instruments. For example, the user input may identify a first set of user-defined control parameters for a first payment instrument to be used when determining whether a resource distribution is permitted when the first payment instrument is used (e.g., to initiate the resource distribution), a second set of user-defined control parameters for a second payment instrument to be used when determining whether a resource distribution is permitted when the second payment instrument is used, and/or the like. In other words, the user-defined control parameters may be specific to the payment instruments associated with the source.

Next, as shown in block 208, the process flow includes receiving a request to authorize a resource distribution. For example, the user may initiate a resource distribution with an entity (e.g., by providing a payment instrument to the entity), and the user and/or the entity may provide a request for the resource distribution to a system similar to system 130 described herein with respect to FIG. 1, such as a resource distribution system, and/or the like. The system may receive the request for the resource distribution. In some embodiments, the request for the resource distribution may include information, data, and/or the like identifying one or more attributes of the resource distribution, such as a source from which resources are to be distributed, a payment instrument used to initiate the resource distribution, an amount of resources to be distributed, a recipient entity of the resources to be distributed, a type of recipient entity, and/or the like. The system may determine (e.g., based on the payment instrument, based on a source associated with the payment instrument, and/or the like) whether user-defined control parameters have been established for the resource distribution (e.g., by accessing a system of record and/or the like). The system may, based on determining that user-defined control parameters have been established, transmit a request to authorize the resource distribution to another system, such as an authorization system and/or the like. In some embodiments, the request to authorize the resource distribution may include information, data, and/or the like identifying one or more attributes of the resource distribution, such as a source from which resources are to be distributed, a payment instrument used to initiate the resource distribution, an amount of resources to be distributed, a recipient entity of the resources to be distributed, a type of recipient entity, and/or the like.

Next, as shown in block 210, the process flow includes determining, based on the user-defined control parameters, whether the resource distribution is permitted. For example, a system similar to system 130 described herein with respect to FIG. 1, such as an authorization system and/or the like, may determine, based on the user-defined control parameters, whether the resource distribution is permitted. In some embodiments, determining whether the resource distribution is permitted may include determining whether attributes of the resource distribution satisfy thresholds based on the user-defined control parameters. For example, a system may determine whether the amount of resources to be distributed is less than a maximum amount determined by the user-defined control parameters. As another example, a system may determine whether the recipient entity is a permitted recipient entity determined by the user-defined control parameters. As another example, a system may determine whether the type of the recipient entity is a permitted type of recipient entity determined by the user-defined control parameters. As another example, a system may determine whether the amount of resources to be distributed is less than a maximum amount for the recipient entity determined by the user-defined control parameters. As another example, a system may determine whether the amount of resources to be distributed is less than a maximum amount for the type of the recipient entity determined by the user-defined control parameters.

Next, as shown in block 212, the process flow includes authorizing, based on determining that the resource distribution is permitted, the resource distribution. For example, a system similar to system 130 described herein with respect to FIG. 1, such as an authorization system and/or the like, may authorize the resource distribution based on determining that the resource distribution is permitted. In some embodiments, authorizing the resource distribution may include transmitting information, data, and/or the like to a resource distribution system, a communication system, a resource distribution control system, and/or the like, and another system may perform the resource distribution from the source to an entity associated with the request. Additionally, or alternatively, the process flow may include performing, based on authorizing the resource distribution, the resource distribution from the source to an entity associated with the request.

In some embodiments, the process flow may include denying, based on determining that the resource distribution is not permitted, the resource distribution. Additionally, or alternatively, the process flow may include denying, based on determining that the resource distribution is not permitted, the resource distribution, and providing, based on denying the resource distribution, a notification to the user. For example, providing the notification to the user may include transmitting information regarding the denied resource distribution to a user device associated with the user (e.g., transmitting a message, a notification, an alert, an email, and/or the like regarding the denied resource distribution).

In some embodiments, the process flow may include receiving, from the user, an instruction to suspend a user-defined control parameter of the user-defined control parameters, receiving another request to authorize another resource distribution, and authorizing, based on the instruction to suspend the user-defined control parameter, the other resource distribution. For example, the user (e.g., using a user device and/or the like) may provide (e.g., after receiving a notification associated with a denied resource distribution) an instruction to suspend a user-defined control parameter to a system similar to system 130 described herein with respect to FIG. 1, such as an authorization system, a resource distribution system, a communication system, a resource distribution control system, and/or the like. The system may receive the instruction to suspend the user-defined control parameter, and then receive another request to authorize another resource distribution. The system may determine, based on the user-defined control parameters, that the other resource distribution is not permitted, but may authorize, based on the instruction to suspend the user-defined control parameter, the other resource distribution.

In some embodiments, the process flow may include receiving, from the user, an instruction to change, for a time period, a user-defined control parameter of the user-defined control parameters, receiving, during the time period, another request to authorize another resource distribution, and authorizing, based on the instruction to change the user-defined control parameter, the other resource distribution. For example, the user (e.g., using a user device and/or the like) may provide (e.g., after receiving a notification associated with a denied resource distribution) an instruction to change, for a time period, a user-defined control parameter to a system similar to system 130 described herein with respect to FIG. 1, such as an authorization system, a resource distribution system, a communication system, a resource distribution control system, and/or the like. The system may receive the instruction to change, for the time period, the user-defined control parameter, and then receive, during the time period, another request to authorize another resource distribution. The system may determine, based on the user-defined control parameters, that the other resource distribution is not permitted, but may authorize, based on the instruction to change the user-defined control parameter, the other resource distribution.

In some embodiments, the process flow may include receiving, from the user, an instruction to change, for a time period, a user-defined control parameter of the user-defined control parameters, receiving, after the time period, another request to authorize another resource distribution, and denying, based on the user-defined control parameters, the other resource distribution. For example, the user (e.g., using a user device and/or the like) may provide (e.g., after receiving a notification associated with a denied resource distribution) an instruction to change, for a time period, a user-defined control parameter to a system similar to system 130 described herein with respect to FIG. 1, such as an authorization system, a resource distribution system, a communication system, a resource distribution control system, and/or the like. The system may receive the instruction to change, for the time period, the user-defined control parameter, and then receive, after the time period, another request to authorize another resource distribution. The system may determine, based on the user-defined control parameters, that the other resource distribution is not permitted, and may deny, based on the user-defined control parameters, the other resource distribution.

In some embodiments, the process flow may include updating, based on historical data of resource distributions, the suggested control parameters to generate updated suggested control parameters and providing the updated suggested control parameters to the user. For example, updating the suggested control parameters may include determining updated suggested control parameters in a manner similar to that described with respect to block 202 based on historical data of resource distributions, where the historical data includes resource distributions performed between a time when the suggested control parameters were determined and another time when determining the updated suggested control parameters. In some embodiments, the process flow may include update the suggested control parameters using machine learning and/or a forecasting model in a manner similar to that described with respect to block 202. Additionally, or alternatively, providing the updated suggested control parameters to the user may be performed in a manner similar to that described with respect to block 204.

In some embodiments, a system may allow a customer to control and/or stop payments, transactions, and/or the like based on pre-configured instructions (e.g., as defined by the customer). However, the customer may provide instructions that are too restrictive (e.g., deny too many transactions) and/or too permissive (e.g., authorize too many resource transactions) as compared to typical transactions initiated by the user. To reduce a likelihood that the user provides too restrictive and/or too permissive instructions, the system may generate insights based on data in a historical transaction database, which may include card, account, merchant name, merchant category (e.g., grocery store, gas station, e-commerce, and/or the like), transaction amount, and/or the like for historical transactions. The system may process the data in the historical database to generate insights, such as a customer's average transaction amount for a merchant, a customer's average transaction amount for a merchant category, and/or the like. The system may, via a presentation layer, such as a graphical user interface, provide insights to the customer for different merchants and/or different merchant categories. In some embodiments, the insights may be specific to the customer (e.g., based on historical transactions of the customer only). Additionally, or alternatively, the insights may be averages for all customers (e.g., based on historical transactions of all customers associated with the system). The customer may perform an action with respect to each insight and provide the system with instructions to control future payments, transactions, and/or the like. In some embodiments, a transaction over a control limit may be declined, the customer may be notified and/or provided with the ability to turn off the control limit (e.g., for a next single transaction, for a duration, and/or the like), set a temporary limit (e.g., for a next single transaction, for a duration, and/or the like), and/or the like. Additionally, or alternatively, the system may update the insights over time, and the customer may adjust the controls as the insights are updated. For example, the customer may view a running average and increase limits over time if needed. In some embodiments, an environment may include a customer facing user interface, an associate facing user interface, a financial authorization system, and a settlement system in communication with a system of record for payment control instructions, which is in communication with a customer communication system.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some embodiments are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for establishment and dynamic adjustment of control parameters associated with resource distribution, the system comprising:

at least one non-transitory storage device; and at least one processing device coupled to the at least one non-transitory storage device, wherein the at least one processing device is configured to:

train, using historical data of resource distributions, a machine learning model to determine attributes of future resource distributions, wherein the historical data of resource distributions comprises historical attributes of previously performed resource distributions associated with multiple users associated with an entity, and wherein the historical attributes comprise sources from which resources were distributed during the previously performed resource distributions, payment instruments used to initiate the previously performed resource distributions, recipient entities of the previously performed resource distributions, and types of recipient entities of the previously performed resource distributions;

determine, using the machine learning model, suggested control parameters for resource distributions associated with a source associated with a user;

provide the suggested control parameters to the user by causing a graphical user interface on a display of a user device associated with the user to display the suggested control parameters;

receive, after providing the suggested control parameters to the user, user input, via the graphical user interface, adjusting the suggested control parameters to identify user-defined control parameters;

receive a request to authorize a resource distribution, wherein the request comprises attributes of the resource distribution, wherein the attributes comprise the source from which resources are to be distributed, a payment instrument used to initiate the resource distribution, a recipient entity of the resources to be distributed, and a type of recipient entity;

determine, based on the source from which resources are to be distributed, the payment instrument used to initiate the resource distribution, the recipient entity of the resources to be distributed, and the type of recipient entity, whether the user-defined control parameters apply to the resource distribution;

determine, based on determining that the user-defined control parameters apply to the resource distribution, based on the attributes of the resource distribution, and based on the user-defined control parameters, whether the resource distribution is permitted;

authorize, based on determining that the resource distribution is permitted, the resource distribution;

perform, based on authorizing the resource distribution, the resource distribution from the source to the recipient entity;

after providing the suggested control parameters to the user, determine updated suggested control parameters for resource distributions associated with the source associated with the user based on historical data of resource distributions performed between a time when the suggested control parameters were determined and another time when determining the updated suggested control parameters; and provide the updated suggested control parameters to the user by causing the graphical user interface on the display of the user device associated with the user to display the updated suggested control parameters.

2. The system of claim 1, wherein the at least one processing device is configured to, when providing the suggested control parameters to the user, transmit the suggested control parameters to the user device associated with the user.

3. The system of claim 1, wherein the at least one processing device is configured to deny, based on determining that the resource distribution is not permitted, the resource distribution.

4. The system of claim 1, wherein the at least one processing device is configured to:
 deny, based on determining that the resource distribution is not permitted, the resource distribution; and
 provide, based on denying the resource distribution, a notification to the user.

5. The system of claim 1, wherein the at least one processing device is configured to:
 receive, from the user, an instruction to suspend a user-defined control parameter of the user-defined control parameters;
 receive another request to authorize another resource distribution; and
 authorize, based on the instruction to suspend the user-defined control parameter, the other resource distribution.

6. The system of claim 1, wherein the at least one processing device is configured to:
 receive, from the user, an instruction to change, for a time period, a user-defined control parameter of the user-defined control parameters;
 receive, during the time period, another request to authorize another resource distribution; and
 authorize, based on the instruction to change the user-defined control parameter, the other resource distribution.

7. The system of claim 1, wherein the at least one processing device is configured to:
 receive, from the user, an instruction to change, for a time period, a user-defined control parameter of the user-defined control parameters;
 receive, after the time period, another request to authorize another resource distribution; and
 deny, based on the user-defined control parameters, the other resource distribution.

8. The system of claim 1, wherein the at least one processing device is configured to, when receiving the user input, receive user input identifying user-defined control parameters for at least one of:
 multiple payment instruments associated with the source; or each payment instrument of multiple payment instruments associated with the source.

9. The system of claim 1, wherein the at least one processing device is configured to, when determining whether the resource distribution is permitted, determine whether the attributes of the resource distribution satisfy thresholds based on the user-defined control parameters.

10. The system of claim 1, wherein the at least one processing device is configured to, when determining the updated suggested control parameters, determine, using the machine learning model, the updated suggested control parameters.

11. A computer program product for establishment and dynamic adjustment of control parameters associated with resource distribution, the computer program product comprising a non-transitory computer-readable medium comprising code causing a first apparatus to:
 train, using historical data of resource distributions, a machine learning model to determine attributes of future resource distributions, wherein the historical data of resource distributions comprises historical attributes of previously performed resource distributions associated with multiple users associated with an entity, and wherein the historical attributes comprise sources from which resources were distributed during the previously performed resource distributions, payment instruments used to initiate the previously performed resource distributions, recipient entities of the previously performed resource distributions, and types of recipient entities of the previously performed resource distributions;
 determine, using the machine learning model, suggested control parameters for resource distributions associated with a source associated with a user;
 provide the suggested control parameters to the user by causing a graphical user interface on a display of a user device associated with the user to display the suggested control parameters;
 receive, after providing the suggested control parameters to the user, user input, via the graphical user interface, adjusting the suggested control parameters to identify user-defined control parameters;
 receive a request to authorize a resource distribution, wherein the request comprises attributes of the resource distribution, wherein the attributes comprise the source from which resources are to be distributed, a payment instrument used to initiate the resource distribution, a recipient entity of the resources to be distributed, and a type of recipient entity;
 determine, based on the source from which resources are to be distributed, the payment instrument used to initiate the resource distribution, the recipient entity of the resources to be distributed, and the type of recipient entity, whether the user-defined control parameters apply to the resource distribution;
 determine, based on determining that the user-defined control parameters apply to the resource distribution, based on the attributes of the resource distribution, and based on the user-defined control parameters, whether the resource distribution is permitted;
 authorize, based on determining that the resource distribution is permitted, the resource distribution;
 perform, based on authorizing the resource distribution, the resource distribution from the source to the recipient entity;
 after providing the suggested control parameters to the user, determine updated suggested control parameters for resource distributions associated with the source associated with the user based on historical data of resource distributions performed between a time when the suggested control parameters were determined and another time when determining the updated suggested control parameters; and
 provide the updated suggested control parameters to the user by causing the graphical user interface on the display of the user device associated with the user to display the updated suggested control parameters.

12. A method for establishment and dynamic adjustment of control parameters associated with resource distribution, the method comprising:
  training, using historical data of resource distributions, a machine learning model to determine attributes of future resource distributions, wherein the historical data of resource distributions comprises historical attributes of previously performed resource distributions associated with multiple users associated with an entity, and wherein the historical attributes comprise sources from which resources were distributed during the previously performed resource distributions, payment instruments used to initiate the previously performed resource distributions, recipient entities of the previously performed resource distributions, and types of recipient entities of the previously performed resource distributions;
  determining, using the machine learning model, suggested control parameters for resource distributions associated with a source associated with a user;
  providing the suggested control parameters to the user by causing a graphical user interface on a display of a user device associated with the user to display the suggested control parameters;
  receiving, after providing the suggested control parameters to the user, user input, via the graphical user interface, adjusting the suggested control parameters to identify user-defined control parameters;
  receiving a request to authorize a resource distribution, wherein the request comprises attributes of the resource distribution, wherein the attributes comprise the source from which resources are to be distributed, a payment instrument used to initiate the resource distribution, a recipient entity of the resources to be distributed, and a type of recipient entity;
  determining, based on the source from which resources are to be distributed, the payment instrument used to initiate the resource distribution, the recipient entity of the resources to be distributed, and the type of recipient entity, whether the user-defined control parameters apply to the resource distribution;
  determining, based on determining that the user-defined control parameters apply to the resource distribution, based on the attributes of the resource distribution, and based on the user-defined control parameters, whether the resource distribution is permitted;
  authorizing, based on determining that the resource distribution is permitted, the resource distribution;
  performing, based on authorizing the resource distribution, the resource distribution from the source to the recipient entity;
  after providing the suggested control parameters to the user, determining updated suggested control parameters for resource distributions associated with the source associated with the user based on historical data of resource distributions performed between a time when the suggested control parameters were determined and another time when determining the updated suggested control parameters; and
  providing the updated suggested control parameters to the user by causing the graphical user interface on the display of the user device associated with the user to display the updated suggested control parameters.

13. The method of claim 12, comprising, when providing the suggested control parameters to the user, transmitting the suggested control parameters to the user device associated with the user.

14. The method of claim 12, comprising denying, based on determining that the resource distribution is not permitted, the resource distribution.

15. The method of claim 12, comprising:
  denying, based on determining that the resource distribution is not permitted, the resource distribution; and
  providing, based on denying the resource distribution, a notification to the user.

16. The method of claim 12, comprising:
  receiving, from the user, an instruction to suspend a user-defined control parameter of the user-defined control parameters;
  receiving another request to authorize another resource distribution; and
  authorizing, based on the instruction to suspend the user-defined control parameter, the other resource distribution.

17. The computer program product of claim 11, wherein the non-transitory computer-readable medium comprises code causing the first apparatus to, when providing the suggested control parameters to the user, transmit the suggested control parameters to the user device associated with the user.

18. The computer program product of claim 11, wherein the non-transitory computer-readable medium comprises code causing the first apparatus to deny, based on determining that the resource distribution is not permitted, the resource distribution.

19. The computer program product of claim 11, wherein the non-transitory computer-readable medium comprises code causing the first apparatus to:
  deny, based on determining that the resource distribution is not permitted, the resource distribution; and
  provide, based on denying the resource distribution, a notification to the user.

20. The computer program product of claim 11, wherein the non-transitory computer-readable medium comprises code causing the first apparatus to:
  receive, from the user, an instruction to suspend a user-defined control parameter of the user-defined control parameters;
  receive another request to authorize another resource distribution; and
  authorize, based on the instruction to suspend the user-defined control parameter, the other resource distribution.

* * * * *